(12) United States Patent
Suzuki et al.

(10) Patent No.: US 12,378,350 B2
(45) Date of Patent: Aug. 5, 2025

(54) AQUEOUS POLYURETHANE RESIN DISPERSION AND METHOD FOR PRODUCING SAME, PAINT, FILM ARRANGEMENT, AND STRUCTURE

(71) Applicant: DAINICHISEIKA COLOR & CHEMICALS MFG. CO., LTD., Chuo-ku (JP)

(72) Inventors: Yusuke Suzuki, Kita-ku (JP); Kazuya Sasaki, Kita-ku (JP); Tatsuzo Murakawa, Kita-ku (JP)

(73) Assignee: DAINICHISEIKA COLOR & CHEMICALS MFG. CO., LTD., Chuo-ku (JP)

( * ) Notice: Subject to any disclaimer, the term of this patent is extended or adjusted under 35 U.S.C. 154(b) by 1095 days.

(21) Appl. No.: 17/054,940

(22) PCT Filed: May 14, 2019

(86) PCT No.: PCT/JP2019/019012
§ 371 (c)(1),
(2) Date: Nov. 12, 2020

(87) PCT Pub. No.: WO2019/221087
PCT Pub. Date: Nov. 21, 2019

(65) Prior Publication Data
US 2021/0253775 A1     Aug. 19, 2021

(30) Foreign Application Priority Data

May 14, 2018   (JP) .................................. 2018-092935

(51) Int. Cl.

| C08G 18/44 | (2006.01) |
|---|---|
| C08G 18/48 | (2006.01) |
| C08G 18/73 | (2006.01) |
| C09D 5/02 | (2006.01) |
| C09D 175/12 | (2006.01) |
| D06N 3/14 | (2006.01) |

(52) U.S. Cl.
CPC ......... C08G 18/4825 (2013.01); C08G 18/44 (2013.01); C08G 18/73 (2013.01); C09D 5/02 (2013.01); C09D 175/12 (2013.01); D06N 3/14 (2013.01); *C08G 2150/00* (2013.01)

(58) Field of Classification Search
CPC .... C08G 18/4825; C08G 18/44; C08G 18/73; C08G 2150/00; C09D 5/02; C09D 175/12; D06N 3/14

See application file for complete search history.

(56) References Cited

U.S. PATENT DOCUMENTS

| 5,854,332 A | 12/1998 | Swarup et al. |
|---|---|---|
| 7,271,216 B2 | 9/2007 | Tanaka et al. |
| 2001/0014715 A1 * | 8/2001 | Blum ..................... C08G 18/44 524/591 |
| 2005/0209425 A1 | 9/2005 | Treiber et al. |
| 2017/0009002 A1 | 1/2017 | Tsukada et al. |
| 2018/0016465 A1 * | 1/2018 | Pedreira ............. C08G 18/3228 |
| 2018/0086938 A1 | 3/2018 | Schaefer et al. |
| 2020/0339808 A1 | 10/2020 | Kraus et al. |

FOREIGN PATENT DOCUMENTS

| CN | 1718606 A | 1/2006 |
|---|---|---|
| CN | 101484542 A | 7/2009 |
| CN | 102216359 A | 10/2011 |
| CN | 103917567 A | 7/2014 |
| CN | 104558486 A | 4/2015 |
| CN | 105085854 A | 11/2015 |
| CN | 205288129 U | 6/2016 |
| CN | 205495388 U | 8/2016 |
| CN | 105960425 A | 9/2016 |
| CN | 106866923 A | 6/2017 |
| CN | 107406566 A | 11/2017 |
| CN | 107709485 A | 2/2018 |
| CN | 107922573 A | 4/2018 |
| CN | 107936221 A | 4/2018 |
| DE | 199 07 988 A1 | 8/2000 |
| JP | 2000-5585 A | 1/2000 |
| JP | 2009-143235 A | 7/2009 |
| JP | 2011-174092 A | 9/2011 |
| JP | 2013-108196 A | 6/2013 |
| JP | 2015-101625 A | 6/2015 |
| JP | 2016-27073 A | 2/2016 |
| JP | 2016-199636 A | 12/2016 |
| JP | 2017-71685 A | 4/2017 |

(Continued)

OTHER PUBLICATIONS

International Search Report issued on Jul. 9, 2019 in PCT/JP2019/019012 filed on May 14, 2019, 2 pages.
Takagi, K., "Scale-up Technology for Emulsifying Process.—from Homo-mixer to High-pressure Homogenizer—," Journal of Society of Cosmetic Chemists of Japan, vol. 30, No. 1, 1996, pp. 36-46 (with English Abstract).
Office Action issued Mar. 23, 2021 in corresponding Japanese Patent Application No. 2020-519636, 7 pages.
Combined Chinese Office Action and Search Report issued Nov. 26, 2021 in corresponding Chinese Patent Application No. 201980032155.4 (with English Translation of Category of Cited Documents) 16 pages.

(Continued)

*Primary Examiner* — Jiangtian Xu
(74) *Attorney, Agent, or Firm* — Oblon, McClelland, Maier & Neustadt, L.L.P.

(57) ABSTRACT

An aqueous polyurethane resin dispersion containing polyurethane resin particles dispersed in water, which contains a nonvolatile component in an amount of 45% by mass or more and in which the polyurethane resin particles contain a polyol component and an isocyanate component, at least 10 mol % or more of the isocyanate component is a linear aliphatic isocyanate component having 4 to 10 carbon atoms, and the volume-average particle size of the polyurethane resin particles is 0.05 to 5 μm.

18 Claims, No Drawings

(56) References Cited

FOREIGN PATENT DOCUMENTS

| WO | WO 2015/119220 A1 | 8/2015 |
| WO | WO 2017/029280 A1 | 2/2017 |
| WO | WO 2018/019904 A1 | 2/2018 |
| WO | WO 2019/129111 A1 | 7/2019 |
| WO | WO 2019/141683 A1 | 7/2019 |

OTHER PUBLICATIONS

Combined Chinese Office Action and Search Report issued Jun. 9, 2022 in Patent Application No. 201980032155.4 (with English translation of Category of Cited Documents), 15 pages.

Tan Weimin, et al., "Preparation and Properties of Bio-Based Pentamethylene Diisocyanate (PDI) Trimer," Paint & Coatings Industry, vol. 50, No. 11, Nov. 2020, pp. 38-44 (with English Abstract).

Jiao Feng, et al., "The influence of the NCO/OH ratio and the 1,6-hexanediol/dimethylol propionic acid molar ratio on the properties of waterborne polyurethane dispersions based on 1,5-pentamethylene diisocyanate," Frontiers of Chemical Science and Engineering, 2018, 10 pages.

Extended European Search Report issued Feb. 18, 2022 in European Patent Application No. 19803042.1, 7 pages.

Office Action issued Apr. 18, 2023, in corresponding Japanese Patent Application No. 2021-157059, 7 pages.

* cited by examiner

AQUEOUS POLYURETHANE RESIN DISPERSION AND METHOD FOR PRODUCING SAME, PAINT, FILM ARRANGEMENT, AND STRUCTURE

TECHNICAL FIELD

The present invention relates to an aqueous polyurethane resin dispersion and a method for producing it, and to a paint, a film arrangement and a structure.

BACKGROUND ART

A polyurethane resin is excellent in various properties such as wear resistance, flexibility, bendability, softness, processability, adhesiveness and chemical resistance, and also excellent in applicability to various processing methods, and is therefore widely used as a binder for materials for synthetic artificial leathers (inclusive term for artificial leathers and synthetic leathers), various coating agents, inks and paints, and also as films, sheets and various molding materials, and polyurethane resins suitable to various uses have been proposed.

For example, in a production process for a leather-like sheet for synthetic artificial leathers, a film formed of a urethane resin composition is used for the purpose of improving texture. In particular, for use for long-term durable hard goods such as vehicle interior materials, a polycarbonate polyol is generally used as a polyol for use in synthesis of urethane resin (for example, see PTL 1).

CITATION LIST

Patent Literature

PTL 1: JP 2013-108196 A

SUMMARY OF INVENTION

Technical Problem

However, when a polycarbonate polyol is merely simply introduced into a urethane resin skeleton, the lightfastness of the resultant leather-like sheet could be excellent but the cold-resistant flexibility thereof may often worsen and the softness thereof may lower.

In particular, a material having excellent bendability in a cold area, namely excellent cold-resistant flexibility and having excellent softness could not be found out as yet.

Heretofore, a solvent-based urethane dissolved in an organic solvent has been used, which, however, involves various problems of toxicity of organic solvent, risk of fire and environmental contamination, and therefore, recently, changeover from a solvent-based urethane to an aqueous polyurethane resin dispersion has become forcedly accelerated.

However, in general, an aqueous polyurethane resin dispersion contains a little amount of a nonvolatile component but contains much water, and therefore in a step of drying the dispersion, there occur various problems that the amount of water (volatile component) to be discharged out of the system is large and the energy amount needed in the drying step increases.

From the above, the present invention provides an aqueous polyurethane resin dispersion, which can reduce the amount of a volatile component to be discharged out of a system in a drying step and can reduce the energy amount needed in drying, and which can exhibit excellent softness and cold-resistant flexibility.

Solution to Problem

As a result of assiduous studies, the present inventors have found that when the content of a nonvolatile component in an aqueous polyurethane resin dispersion is controlled to be a specific amount or more, the energy amount needed for drying can be reduced, and that when a linear aliphatic isocyanate component having 4 to 10 carbon atoms is used in a specific ratio as an isocyanate component to constitute polyurethane resin particles, softness and cold-resistant flexibility can be improved. Further, the inventors have found that when the volume-average particle size of polyurethane resin particles is controlled to fall within a specific range, the softness of a paint using the dispersion of the present invention can be improved and the above-mentioned problems can be thereby solved, and have completed the present invention. Specifically, the present invention is as described below.

[1] An aqueous polyurethane resin dispersion containing polyurethane resin particles dispersed in water, which contains a nonvolatile component in an amount of 45% by mass or more and in which the polyurethane resin particles contain a polyol component and an isocyanate component, at least 10 mol % or more of the isocyanate component is a linear aliphatic isocyanate component having 4 to 10 carbon atoms, and the volume-average particle size of the polyurethane resin particles is 0.05 to 5 μm.

[2] The aqueous polyurethane resin dispersion according to [1], wherein the polyurethane resin particles contain a short-chain diol component and/or a short-chain diamine component.

[3] The aqueous polyurethane resin dispersion according to [1] or [2], wherein at least one selected from the group consisting of the polyol component, the isocyanate component, the short-chain diol component and the short-chain diamine component is composed of a plant based raw material.

[4] The aqueous polyurethane resin dispersion according to any of [1] to [3], wherein the biomass ratio in the polyurethane resin particles is 10% by weight or more.

[5] The aqueous polyurethane resin dispersion according to any of [1] to [4], wherein the polyurethane resin particles fuse via a drying step to form a film.

[6] A method for producing the aqueous polyurethane resin dispersion of any of [1] to [5], including: reacting at least a polyol and an isocyanate in a mixing tank equipped with an impeller for circulating inside the tank and an impeller for imparting shear force.

[7] A paint containing the aqueous polyurethane resin dispersion of any of [1] to [5].

[8] The paint according to [7], further containing at least one selected from the group consisting of an isocyanate-based crosslinking agent, a carbodiimide-based crosslinking agent, an oxazoline-based crosslinking agent, and an epoxy-based crosslinking agent.

[9] A film arrangement including a filmy material of the paint of [7] or [8].

[10] A structure including the film arrangement of [9] as at least any of a skin layer, an interlayer and an adhesive layer.

[11] A structure including the paint of [7] or [8] in at least any of the surface or the inside thereof.

[12] A synthetic artificial leather including the structure of [10] or [11].

Advantageous Effects of Invention

According to the present invention, there can be provided an aqueous polyurethane resin dispersion which can reduce the amount of a volatile component to be discharged out of a system in a drying step and the energy amount needed for drying, and which can exhibit excellent softness and cold-resistant flexibility.

DESCRIPTION OF EMBODIMENTS

Hereinunder the present invention is described in detail. In the present invention, a polyurethane resin is an inclusive term for a polyurethane resin and a polyurethane-urea resin.
[Aqueous Polyurethane Resin Dispersion]

The aqueous polyurethane resin dispersion of the present invention is an aqueous polyurethane resin dispersion containing polyurethane resin particles dispersed in water, which contains a nonvolatile component in an amount of 45% by mass or more and in which the polyurethane resin particles contain a polyol component and an isocyanate component, at least 10 mol % or more of the isocyanate component is a linear aliphatic isocyanate component having 4 to 10 carbon atoms, and the volume-average particle size of the polyurethane resin particles is 0.05 to 5 μm.

In the present invention, the "nonvolatile component" indicates polyurethane resin particles and nonvolatile additives to be described hereinunder, and indicates a solid residue to be formed by drying 2 g of the aqueous polyurethane resin dispersion at 120° C. for 2 hours.

The constituent components to constitute the polyurethane resin particles contained in the aqueous polyurethane resin dispersion are described in more detail.
<Polyurethane Resin Particles>

The polyurethane resin to constitute the polyurethane resin particles contained in the aqueous polyurethane resin dispersion of the present invention is formed mainly from a polyol and an isocyanate, for which, as needed, a chain extender such as a short-chain diol and a short-chain diamine, as well as a compound having one or more active hydrogen groups and having a hydrophilic group and a polysiloxane compound for modifying the polyurethane resin may be optionally used.
[Polyol]

The polyol to be the polyol component in the present invention indicates one having a number-average molecular weight of 500 or more, and examples thereof include the following (1) to (6).
(1) Polycarbonate Polyol The polycarbonate polyol includes a polycarbonate diol such as polytetramethylene carbonate diol, polypentamethylene carbonate diol, polyneopentyl carbonate diol, polyhexamethylene carbonate diol, and poly(1,4-cyclohexanedimethylene carbonate) diol, and a random/block copolymer thereof. From the viewpoint of increasing a biomass ratio, a plant based raw material is preferred.
(2) Polyether Polyol The polyether polyol includes one produced by polymerizing or copolymerizing any of an alkylene oxide (e.g., ethylene oxide, propylene oxide, butylene oxide), and a heterocyclic ether (e.g., tetrahydrofuran). Specifically, the polyether polyol includes polyethylene glycol, polypropylene glycol, polyethylene glycol-polytetramethylene glycol (block or random), polytetramethylene ether glycol, and polyhexamethylene glycol, and from the viewpoint of increasing a biomass ratio, a plant based raw material is preferred.
(3) Polyester Polyol The polyester polyol includes one produced by polycondensing at least any one of an aliphatic dicarboxylic acid (e.g., succinic acid, adipic acid, sebacic acid, glutaric acid, and azelaic acid) and an aromatic dicarboxylic acid (e.g., isophthalic acid and terephthalic acid), and a low-molecular-weight glycol (e.g., ethylene glycol, 1,2-propylene glycol, 1,3-propylene glycol, 1,3-butanediol, 1,4-butylene glycol, 1,5-pentanediol, 1,6-hexamethylene glycol, neopentyl glycol and 1,4-bishydroxymethylcyclohexane).

Specifically, the polyester polyol includes polyethylene adipate diol, polybutylene adipate diol, polyhexamethylene adipate diol, polyneopentyl adipate diol, polyethylene/butylene adipate diol, polyneopentyl/hexyl adipate diol, poly-3-methylpentane adipate diol, and polybutylene isophthalate diol. From the viewpoint of increasing a biomass ratio, a plant based raw material is preferred.
(4) Polylactone Polyol The polylactone polyol includes polycaprolactone diol and poly-3-methylvalerolactone diol.
(5) Polyolefin polyol The polyolefin polyol includes polybutadiene glycol and polyisoprene glycol, or a hydrate thereof.
(6) Polymethacrylate diol The polymethacrylate diol includes $\alpha,\omega$-polymethyl methacrylate diol and $\alpha,\omega$-polybutyl methacrylate diol.

The number-average molecular weight of the polyol is not specifically limited so far as it is 500 or more, but is preferably 500 to 4,000 or so. One alone or two or more of these polyols may be used either singly or as combined, but from the viewpoint of long-term durability, preferably, a polycarbonate diol is contained.

The number-average molecular weight is a polystyrene-equivalent number-average molecular weight, and is generally measured through gel permeation chromatography (GPC).
[Isocyanate]

In the present invention, at least 10 mol % or more of the isocyanate component to constitute the polyurethane resin particles is a linear aliphatic isocyanate component having 4 to 10 carbon atoms. When at least 10 mol % or more of the isocyanate component is a linear aliphatic isocyanate component having 4 to 10 carbon atoms, the softness of the polyurethane resin skeleton increases, as compared with a case using an aromatic or alicyclic isocyanate simple substance, and therefore the paint using the aqueous polyurethane resin dispersion of the present invention is given softness and cold-resistant flexibility.

Examples of the linear aliphatic isocyanate having 4 to 10 carbon atoms to be the linear aliphatic isocyanate component having 4 to 10 carbon atoms include 1,4-tetramethylene diisocyanate, 1,5-pentamethylene diisocyanate, 1,6-hexamethylene diisocyanate, 1,7-heptamethylene diisocyanate, and 1,8-octamethylene diisocyanate. Among these, from the viewpoint of increasing the softness of the paint using the aqueous polyurethane resin dispersion of the present invention, a linear aliphatic isocyanate having 4 to 8 carbon atoms is preferred, and 1,5-pentamethylene diisocyanate or 1,6-hexamethylene diisocyanate is more preferred, and from the viewpoint of increasing the biomass ratio, 1,5-pentamethylene diisocyanate that is a plant based raw material is even more preferred.

In the isocyanate component to constitute the polyurethane resin particles, the amount of the linear aliphatic isocyanate component having 4 to 10 carbon atoms is preferably 15 mol % or more, more preferably 25 mol % or more, even more preferably 35 mol % or more, further more preferably 45 mol % or more.

Examples of isocyanates except the linear aliphatic isocyanate having 4 to 10 carbon atoms include aromatic diisocyanates such as toluene-2,4-diisocyanate, toluene-2,6-diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 4,4'-methylenebis(phenylene isocyanate) (MDI), jurylene diisocyanate, xylylene diisocyanate (XDI), 1,5-naphthalene diisocyanate, benzidine diisocyanate, o-nitrobenzidine diisocyanate, and 4,4'-diisocyanate dibenzyl; aliphatic diisocyanates such as methylene diisocyanate, and 1,10-decamethylene diisocyanate; alicyclic diisocyanates such as 1,4-cyclohexylene diisocyanate, 4,4'-methylenebis(cyclohexyl isocyanate) (hydrogenated MDI), 1,5-tetrahydronaphthalene diisocyanate, isophorone diisocyanate (IPDI), and hydrogenated XDI; and polyurethane prepolymers prepared by reacting such a diisocyanate compound and a low-molecular-weight polyol or polyamine so as to have an isocyanate terminal.

[Chain Extender]

Preferably, the polyurethane resin particles in the present invention contain a short-chain diol component, a short-chain diamine component and a compound component having one or more active hydrogens and having a hydrophilic group, and more preferably contain a short-chain diol and/or a short-chain diamine component.

(Short-Chain Diol)

The diol to be a short-chain diol component is a compound having a number-average molecular weight of less than 500, and includes aliphatic glycols such as ethylene glycol, 1,2-propanediol, 1,3-propanediol, 1,3-butanediol, 1,4-butanediol, 1,5-pentanediol, 1,6-hexanediol and neopentyl glycol, and alkylene oxide low-mol adducts thereof; alkylene ether glycols such as diethylene glycol, triethylene glycol, and dipropylene glycol; alicyclic glycols such as 1,4-bishydroxymethylcyclohexane, and 2-methyl-1,1-cyclohexanedimethanol, and alkylene oxide low-mol adducts thereof; aromatic glycols such as xylylene glycol, and alkylene oxide low-mol adducts thereof; bisphenols such as bisphenol A, thiobisphenol and sulfone bisphenol, and alkylene oxide low-mol adducts thereof; and alkyldialkanolamines such as C1 to C18 alkyldiethanolamines. Among these, aliphatic glycols are preferred, and from the viewpoint of increasing the biomass ratio, plant based raw materials of 1,3-propanediol, 1,4-butanediol and 1,10-decanediol are more preferred.

(Short-Chain Diamine)

The diamine to be a short-chain diamine component includes aliphatic diamine compounds such as ethylenediamine, trimethylenediamine, hexamethylenediamine, and octamethylenediamine; aromatic diamine compounds such as phenylenediamine, 3,3'-dichloro-4,4'-diaminodiphenylmethane, 4,4'-methylenebis(phenylamine), 4,4'-diaminodiphenyl ether, and 4,4'-diaminodiphenyl sulfone; alicyclic diamine compounds such as cyclopentanediamine, cyclohexyldiamine, 4,4-diaminodicyclohexylmethane, 1,4-diaminocyclohexane, 1,3-bisaminomethylcyclohexane, and isophoronediamine; and hydrazines such as hydrazine, carbodihydrazide, adipic acid dihydrazide, sebacic acid dihydrazide, and phthalic acid dihydrazide. Among these, from the viewpoint of improving softness of polyurethane resins, hydrazines are more preferred, and from the viewpoint of increasing the biomass ratio, plant based raw materials are preferred.

(Compound Having One or More Active Hydrogens and Having Hydrophilic Group)

In the present invention, a compound having one or more active hydrogens and having a hydrophilic group, except the above-mentioned compounds, may also be used. As the compound having one or more active hydrogens and having a hydrophilic group, any known compound usable as a component for imparting dispersibility in water to polyurethane resin particles can be used.

In the compound, the active hydrogen is a hydrogen atom that reacts with the isocyanate group of an isocyanate, and includes a hydrogen atom of a hydroxy group, a mercapto group or an amino group. Among these, a hydrogen atom of a hydroxy group is preferred. The hydrophilic group is a functional group for imparting dispersibility in water, and may be any of an anionic, cationic or nonionic one. An anionic group is preferred. The anionic hydrophilic group includes a carboxy group, a sulfone group, and a phosphate group, and among these, a carboxy group is preferred.

As the compound having an anionic hydrophilic group, those having a sulfonic acid-type, carboxylic acid-type or phosphoric acid-type hydrophilic group are usable, and examples thereof include carboxylic acid compounds such as dimethylolpropanoic acid, dimethylolbutanoic acid, lactic acid, and glycine; and sulfonic acid compounds such as taurine, and sulfoisophthalic acid-type polyester diols.

Among these, dialcohol carboxylic acid compounds, especially dimethylolalkanoic acids such as dimethylolpropanoic acid, and dimethylolbutanoic acid are preferably used.

The hydrophilic group may be neutralized with a neutralizing agent to be a salt. The neutralizing agent for an anionic hydrophilic group includes aqueous ammonia, organic amines, for example, alkylamines such as ethylamine, trimethylamine, triethylamine, triisopropylamine and tributylamine, and alkanolamines such as triethanolamine, N-methyldiethanolamine, N-phenyldiethanolamine, monoethanolamine, diethanolamine, dimethylethanolamine, diethylethanolamine and 2-amino-2-ethyl-1-propanol; and alkali metal hydroxides such as lithium hydroxide, sodium hydroxide and potassium hydroxide. Among these, tertiary alkylamines such as triethylamine, sodium hydroxide, and tertiary alkanolamines such as dimethylaminoethanol are preferred.

The above-mentioned alkanolamine can also be used as a chain elongation terminator.

In the present invention, from the viewpoint of solving concerns about petroleum resource depletion and from the viewpoint of environmental friendliness, preferably, at least one selected from the group consisting of the above-mentioned polyol component, isocyanate component, short-chain diol component and short-chain diamine component each constituting the polyurethane resin particles is formed of a plant based raw material.

Also from the viewpoint of solving concerns about petroleum resource depletion and from the viewpoint of environmental friendliness, the biomass ratio (plant based raw material ratio) in the polyurethane resin particles is preferably 10% by mass or more, more preferably 20% by mass or more, even more preferably 30% by mass or more.

The biomass ratio can be determined from the amount of the plant based raw material in the entire amount of the materials to be blended.

The above are exemplifications of preferred components, and the present invention is not limited to these. Accordingly, not only the components exemplified in the above but also any other compounds currently sold on the market and readily available from the market can be used.

[Polysiloxane Compound]

A polysiloxane compound is used for polysiloxane modification of a polyurethane resin. As a result of polysiloxane modification, the wear resistance of the paint using the aqueous polyurethane resin dispersion of the present invention can be improved. As the polysiloxane compounds, compounds having a structure of the following (1) to (4) can be used.

(1) Amino-Modified Polysiloxane

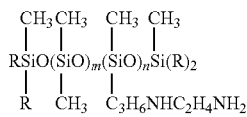

(m=1 to 10, n=2 to 10, R=CH₃ or OCH₃)

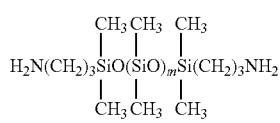

(m 0 to 200)

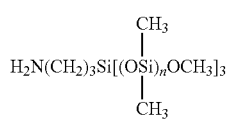

(n=2 to 10)

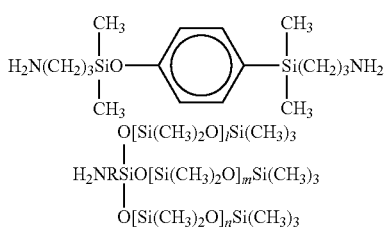

(branching points=2 to 3, R=lower alkyl group, l=2 to 200, m=2 to 200, n=2 to 200)

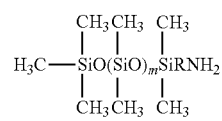

(m=1 to 200, R=lower alkyl group)

(2) Epoxy-Modified Polysiloxane

Regarding use thereof, the following epoxy compounds are reacted with a polyol, a polyamide or a polycarboxylic acid to make the resultant compound have a terminal active hydrogen.

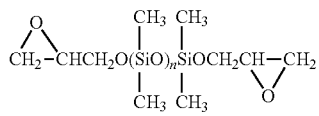

(n=1 to 200)

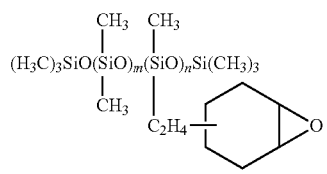

(m=1 to 10, n=2 to 10)

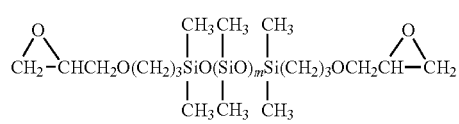

(m=1 to 200)

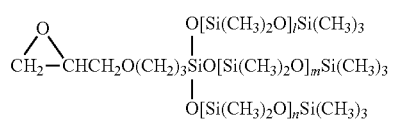

(branching points=2 to 3, l=2 to 200, m=2 to 200, n=2 to 200)

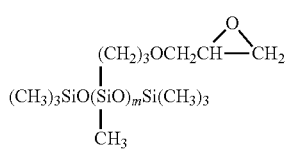

(m=1 to 10)

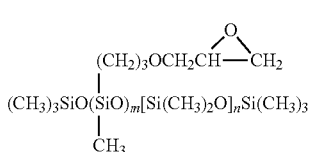

(m=1 to 10, n=2 to 10)

(3) Alcohol-Modified Polysiloxane

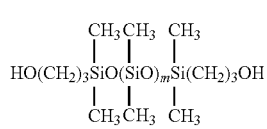

(m=1 to 300)

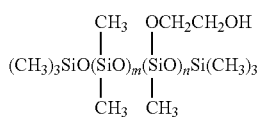

(m=1 to 300, n=2 to 50)

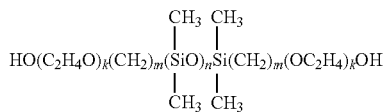

(k=1 to 200, m=2 to 6, n=1 to 400)

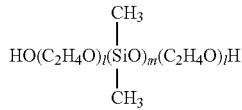

(l=1 to 200, m=1 to 200)

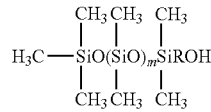

(m=1 to 400, R=lower alkyl group)

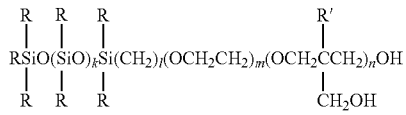

(R=CH₃ or OCH₃, R'=hydrogen atom or alkyl group, k=1 to 250, l=0 to 5, m=0 to 50, n=1 to 3)

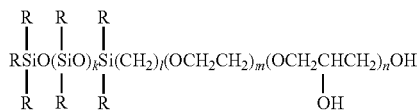

(R=CH₃ or OCH₃, k=1 to 250, l=0 to 5, m=0 to 50, n=1 to 3)

(4) Mercapto-Modified Polysiloxane

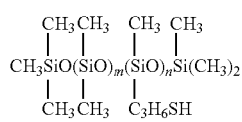

(m=1 to 20, n=2 to 100)

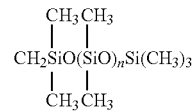

(n=2 to 100)

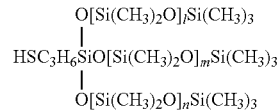

(branching points=2 to 3, l=2 to 200, m=2 to 200, n=2 to 200)

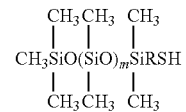

(m=1 to 300, R=lower alkyl group)

The above-mentioned polysiloxane compounds (1) to (4) are exemplifications of preferred compounds, but these are not limitative. Among the above, alcohol-modified polysiloxanes are preferred, and the following compounds are more preferred.

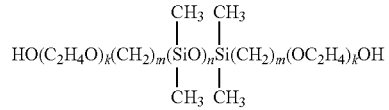

(k=1 to 200, m=2 to 6, n=1 to 400)

[Volume-Average Particle Size of Polyurethane Resin Particles]

The volume-average particle size of the polyurethane resin particles in the present invention is 0.05 to 5 μm. When the volume-average particle size of the polyurethane resin particles is less than 0.05 μm, the viscosity of the aqueous dispersion increases to worsen operability, and if so, the nonvolatile content needs to be lowered. On the other hand, when the volume-average particle size is more than 5 μm, the particles may readily precipitate to cause a risk of forming a hard cake of the resin component. The polyurethane resin particles satisfying the volume-average particle size can be produced, for example, by controlling the rotation speed of each mixing impeller in a production apparatus equipped with three mixing impellers to be described hereinunder.

From such viewpoints, the volume-average particle size of the polyurethane resin particles is preferably 0.07 to 4.5 μm, more preferably 0.09 to 4 μm, even more preferably 0.1 to 3.5 μm.

[Production Method for Aqueous Polyurethane Resin Dispersion]

One example of a production method for the aqueous polyurethane resin dispersion of the present invention is a method of reacting and emulsifying at least a polyol and an isocyanate in a mixing tank having a mixing impeller for in-tank circulation and a mixing impeller for shear force impartation.

According to the production method, polyurethane resin particles having the above-mentioned high nonvolatile component concentration and having the above-mentioned volume-average particle size can be produced efficiently.

Specifically, in a reactor (the above-mentioned mixing tank) equipped with mixing impellers capable of attaining both pulverization and homogenization and capable of being applicable to an ultrahigh viscosity liquid, a polyol, a short-chain diol as an optional component, an isocyanate, and a compound having one or more active hydrogen groups and having a hydrophilic group are reacted, and thereafter a neutralizing agent, a chain extender such as a short-chain diamine, and a chain elongation terminator, a surfactant and ion-exchanged water are added and further reacted while emulsified to produce the intended dispersion.

Examples of the mixing tank include a mixing device equipped with three mixing impellers in the mixing tank, for example, two mixing impellers for the purpose of in-tank circulation and one shear force-imparting mixing impeller for imparting high shear force in the tank, and above all, a mixing device having mixing impellers in three sites of the top, the bottom and the intermediate portion between the top and the bottom in the reactor is preferred. Specifically, there are mentioned a high-viscosity high-shear combined mixing device (product name: NANOVisK, from Sumitomo Heavy Industries Process Equipment Co., Ltd.), and a vacuum emulsifying mixing device (from Mizuho Industrial Co., Ltd.). Using the mixing device, the nonvolatile component can be readily controlled to be 45% by mass or more.

In the production method, an organic solvent may be used, if necessary.

Examples of the organic solvent include ketone solvents (e.g., acetone, methyl ethyl ketone, methyl isobutyl ketone, cyclohexanone), aromatic hydrocarbon solvents (e.g., toluene, xylene, Swasol (aromatic hydrocarbon solvent from Cosmo Energy Group), Solvesso (aromatic hydrocarbon solvent from Exxon Chemical Corporation)), and aliphatic hydrocarbon solvents (e.g., n-hexane). Among these, from the viewpoint of handleability, methyl ethyl ketone, acetone and tetrahydrofuran are preferred.

The surfactant includes nonionic surfactants, anionic surfactants and ampholytic surfactants.

Examples of the nonionic surfactant include glycol ethers such as polyoxyethylene alkyl ether, and acetylene glycol.

Examples of the anionic surfactant include salts of polyoxyethylene alkyl ether acetates, dodecylbenzene sulfonates, and polyoxyethylene alkyl ether sulfates.

Examples of the ampholytic surfactant include laurylaminopropionate, lauryldimethylbetaine, stearyldimethylbetaine, stearyldimethylamine oxide, and dihydroxyethyllaurylamine oxide.

Among these, anionic surfactants are preferred, and polyoxyethylene alkyl ether acetates and dodecylbenzene sulfonates are more preferred.

<Amount of Nonvolatile Component in Aqueous Polyurethane Resin Dispersion>

In the present invention, the nonvolatile component in the aqueous polyurethane resin dispersion is 45% by mass or more, and therefore the amount of the volatile component to be discharged out from the system by evaporation in a drying step is small and the energy amount necessary for drying can be reduced.

In the present invention, from the viewpoint of reducing the energy amount to be used in a drying step, the amount of the nonvolatile component in the aqueous polyurethane resin dispersion is preferably 47% by mas or more preferably 49% by mass or more, even more preferably 50% by mass or more.

As described above, the amount of the volatile component in the aqueous polyurethane resin dispersion of the present invention is small, and therefore, the volatile component can be more readily removed than usual, and via a drying step, the polyurethane resin particles can fuse to cause film formation. Film formation as referred to herein is, for example, such that the aqueous polyurethane resin dispersion of the present invention is applied to a release paper so as to form a film thereon having a thickness of 40 μm and then dried at 120° C. for 5 minutes, and the resultant film can be peeled from the release paper while maintaining the film form thereof.

<Additives>

The aqueous polyurethane resin dispersion of the present invention may contain additives, as needed. Examples of the additives include a matting agent, an antioxidant (e.g., hindered phenol-based, phosphite-based, thioether-based), a light stabilizer (e.g., hindered amine-based), a UV absorbent (e.g., benzophenone-based, benzotriazole-based), a vapor discoloration stabilizer (e.g., hydrazine-based), and a metal deactivator.

The matting agent includes resin particles, silica particles, talc, aluminum hydroxide. calcium sulfate, calcium silicate, calcium carbonate, magnesium carbonate, barium carbonate, alumina silicate, molecular sieves, kaolin, mica, and mica. In the case where the aqueous polyurethane resin dispersion of the present invention contains a matting agent, the resultant coating film to be a skin layer can have a mat tone.

[Paint]

The paint of the present invention contains an aqueous polyurethane resin dispersion, and can reduce the energy amount necessary for drying as containing a large amount of a nonvolatile component, and in addition, the softness of the coating film can be improved as using a linear aliphatic isocyanate having 4 to 10 carbon atoms as the isocyanate component to constitute the polyurethane resin particles.

For improving durability, the paint of the present invention preferably contains, in addition to the aqueous polyurethane resin dispersion, at least one selected from the group consisting of an isocyanate-based crosslinking agent, a carbodiimide-based crosslinking agent, an oxazoline-based crosslinking agent and an epoxy-based crosslinking agent.

When the amount of the crosslinking agent used is too large, there may occur some troubles of film embrittlement, and plasticization by unreacted crosslinking agent. Consequently, the amount of the crosslinking agent to be used is, relative to 100 parts by mass of the polyurethane resin, preferably 10 parts by mass or less in terms of the crosslinking agent solid content, more preferably 1.0 to 7.5 parts by mass.

[Film Arrangement, Structure]

The film arrangement of the present invention includes a filmy material of the paint of the present invention. The structure of the present invention includes the film arrangement as at least any one of a skin layer, an interlayer and an adhesive layer.

The film arrangement includes various configurations of a simple substance of the film, and a laminate including at least the film and laminated with the film or any other layer.

Preferably, the structure of the present invention includes the paint of the present invention in at least any of the surface or the inside thereof. The structure includes a synthetic artificial leather, and the substrate for synthetic artificial leather to be used in the synthetic artificial leather includes a woven fabric, a nonwoven fabric and a sponge.

The synthetic artificial leather can be produced, for example, as follows. First, as an aqueous skin-forming agent to form a skin layer, the aqueous polyurethane resin dispersion of the present invention is applied onto a release paper, according to a known method of comma coating, knife coating or roll coating. This is appropriately dried to form a skin layer. On the skin layer, as an aqueous adhesive to be applied thereto, a known aqueous polyurethane resin adhesive is applied according to a known method of comma coating, knife coating or roll coating. This is dried, and then pressure-bonded to a substrate for synthetic artificial leather. Further, this is matured and then released from the release paper to be a synthetic artificial leather.

For exemplification of the film arrangement and the structure, a method for producing them by applying the aqueous polyurethane resin dispersion of the present invention to a substrate is described below.

<Substrate>

The substrate includes a film and a synthetic leather using a resin mentioned below. The substrate may be a foamed substrate.

The resin includes polyvinyl chloride resins, polyethylene resins, polypropylene resins, olefin-based resins such as thermoplastic polyolefins, ethylene-propylene-diene resins, styrene-acrylonitrile resins, polysulfone resins, polyphenylene ether resins, acrylic resins, silicone resins, fluororesins, polyester resins, polyamide resins, polyimide resins, polystyrene resins, polyurethane resins, polycarbonate resins, norbornene resins, cellulose resins, polyvinyl alcohol resins, polyvinyl formal resins, polyvinyl butyral resins, polyvinylpyrrolidone resins, polyvinyl acetal resins, polyvinyl acetate resins, engineering plastics, and biodegradable plastics.

In particular, for interior materials for vehicles, there are mentioned polyvinyl chloride resins, thermoplastic polyolefins, polyurethanes and polypropylenes.

In the case where the substrate is a foamed substrate, a substrate of a polyvinyl chloride resin can be used.

The thickness of the substrate is preferably 0.2 to 0.8 mm, and in the case where the substrate is a foamed substrate and, after foamed, the thickness thereof is preferably 0.3 to 4.5 mm.

<Production Method>

The aqueous polyurethane resin dispersion of the present invention is applied to a substrate, then dried at 80 to 140° C., and optionally crosslinked to form a coating film.

In the case where the substrate is a foamed substrate, for example, where the substrate is a polyvinyl chloride resin substrate sheet, the method includes a step of foaming the foaming agent in the vinyl chloride foaming layer composition by heating to form a foamed polyvinyl chloride layer (foaming step). For example, prior to the step, the aqueous polyurethane resin dispersion of the present invention is applied to the substrate sheet by spray coating or gravure coating to form a coating film. Subsequently, this is dried at 80 to 140° C. for 1 to 3 minutes to form a coating film, and then foamed at 130 to 230° C. Further, for imparting a design appearance to the film, an embossing roll having an embossing pattern engraved on the side of the surface treatment layer is pressed against the film while the surface of the film is kept heated (at 100 to 190° C.), thereby giving a synthetic resin skin material having an embossed pattern formed on the surface thereof (for example, vehicle seats) (patterning step).

In the case where the aqueous polyurethane resin dispersion of the present invention is applied to a poorly-adhesive thermoplastic resin substrate, the surface of the substrate may be primer-treated for increasing the adhesiveness thereto to the coating material.

The foaming step and the patterning step may be carried out separately prior to the film-forming step, or may be carried out after the surface treatment layer-forming step. Specifically, herein employable is a method of applying an aqueous polyurethane resin dispersion to an unfoamed substrate and then foaming the substrate by heating, or a method of applying an aqueous polyurethane resin dispersion to a foamed substrate. Because of the reason of improving uniform coatability with the surface treatment layer and improving the adhesion strength of the layer, a method of foaming the substrate after coated with an aqueous polyurethane resin layer is preferred.

The thickness of the coating film formed as above is preferably 2 to 30 μm.

EXAMPLES

The present invention is described more specifically with reference to Examples and Comparative Examples given below, but the present invention is not limited to these. "Part" given below means part by mass, and "%" means % by mass.

Synthetic Examples 1 to 13, Synthetic Comparative Examples 1 to 4

PUDs 1 to 13 and comparative PUDs 1 to 4 were produced according to the formulation shown in Tables 1 and 2 and according to the resin synthesis methods mentioned below. Resin synthesis methods a and b are as follows.

[Resin Synthesis Method a]

A reactor equipped with a mixing tank (product name: NANOVisK, from Sumitomo Heavy Industries Process Equipment Co., Ltd.) having three mixing impellers, a reflux condenser, a thermometer, and a nitrogen inlet tube and manhole is purged with nitrogen gas, and then a polyol, a chain extender, a compound having one or more active hydrogens and having a hydrophilic group, and an isocyanate were put thereinto, and heated up to a reaction temperature with stirring. While the reaction temperature was kept as such, and after an arbitrary period of time, the remaining NCO % in the prepolymer was measured to give a terminal NCO group-containing prepolymer. Next, the container was cooled, and after the internal temperature lowered to 60° C., triethylamine was added and the system was stirred uniformly.

After the system was confirmed to be uniform, a dodecylbenzenesulfonate was added with stirring, and mixed. Subsequently, with strongly stirring, a mixture of ion-exchanged water and 60% hydrated hydrazine was added for chain extension with emulsification to give an aqueous polyurethane resin dispersion.

[Resin Synthesis Method b]

A reactor equipped with one mixer, a reflux condenser, a thermometer, and a nitrogen inlet tube and manhole is purged with nitrogen gas, and then a polyol, a chain extender, a compound having one or more active hydrogens and having a hydrophilic group, acetone and an isocyanate were put thereinto, and heated up to a reaction temperature with stirring. While the reaction temperature was kept as such, and after an arbitrary period of time, the remaining NCO % in the prepolymer was measured to give a terminal NCO group-containing prepolymer. Next, the container was cooled, and after the internal temperature lowered to 60° C., triethylamine was added and the system was stirred uniformly.

After the system was confirmed to be uniform, a dodecylbenzenesulfonate was added with stirring, and mixed. Subsequently, with strongly stirring, a mixture of ion-exchanged water and 60% hydrated hydrazine was added for chain extension with emulsification. Subsequently, acetone was evaporated away with heating at 65° C. under reduced pressure to give an aqueous polyurethane resin dispersion.

[Method for Measurement of Remaining NCO % in Prepolymer]

One gram of the resin was weighed out from the reactor under reaction, and completely dissolved in 50 g of DMF. Next, 10 ml of a di-n-butylamine solution (concentration 6.5%) prepared by dissolving di-n-butylamine in ethyl acetate was added thereto and fully stirred. The resultant sample solution was set in a universal automatic titration device [GT-200](from Mitsubishi Chemical Analytech Corporation), and neutralized by titration with 0.5 mol/1 hydrochloric acid to measure the remaining NCO % in the prepolymer. In the case where the resin was a resin solution, the data were converted into solid-equivalent values.

<Aqueous Polyurethane Dispersion Evaluation Method>

The resultant aqueous polyurethane dispersion was evaluated in point of the nonvolatile component, the volume-average particle size, the emulsification performance and the dispersion stability thereof, according to the methods and the criteria mentioned below. The evaluation results are shown in Tables 1 and 2.

(Measurement of Nonvolatile Component)

The weight of a stainless container was measured with an electronic balance ($g0$), and 2 g of the resultant aqueous polyurethane dispersion was weighed in the stainless container ($g1$). Next, the stainless container with which the aqueous polyurethane dispersion had been measured was dried at 120° C. for 2 hours, and the weight thereof after drying was measured ($g2$). From the resultant weights and according to the following equation (1), the nonvolatile component was measured.

$$\text{Nonvolatile component (\% by mass)} = (g2-g0)/(g1-g0) \times 100 \tag{1}$$

(Measurement of Volume-Average Particle Size)

The resultant aqueous polyurethane resin dispersion was diluted with ion-exchanged water to have a nonvolatile content of 0.1% by mass, and then analyzed using a dynamic light-scattering (DLS) particle sizer [Nanotrac Wave II (from Microtrack BEL Corporation)].

(Emulsification Performance)

Easiness in emulsification and dispersion of a polyurethane resin in emulsifying and extending in water was checked visually and from operability, and evaluated according to the following criteria.

A: The aqueous dispersion had a low viscosity and was readily emulsified and dispersed.

B: The aqueous dispersion had a high viscosity and could hardly be emulsified or dispersed, or in the solvent removal step after emulsification and extension, the aqueous dispersion was thickened and the dispersion condition thereof worsened.

C: The resin could not be emulsified, and an aqueous dispersion thereof could not be produced.

(Dispersion Stability)

The aqueous polyurethane dispersion was left at room temperature (25° C.) for 24 hours, and the condition of the aqueous dispersion was visually checked. A case with no problem of formation of lumps or deposits is ranked as "A", and for a case with such a problem, the condition thereof is described in Tables 1 and 2.

TABLE 1

| | | Synthesis Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Sample Designation | | PUD1 | PUD2 | PUD3 | PUD4 | PUD5 | PUD6 | PUD7 | PUD8 | PUD9 | PUD10 | PUD11 | PUD12 | PUD13 |
| Polyol | A | 50 | 50 | — | — | — | 90 | — | — | — | — | — | — | — |
| | B | 50 | 50 | 50 | 50 | 50 | 10 | 50 | 50 | 50 | 50 | 50 | 50 | 50 |
| | C | — | — | 50 | 50 | 50 | — | 50 | 50 | 50 | 50 | 50 | 50 | 50 |
| Chain Extender | D | — | 0.5 | 0.5 | 0.5 | 0.5 | 0.5 | 0.5 | 0.5 | 0.5 | 0.5 | 0.5 | 0.5 | 0.5 |
| Hydrophilic Component | E | 4.6 | 1.2 | 1.2 | 1.2 | 1.2 | 1.2 | 1.2 | 1.2 | 1.2 | 1.2 | 1.2 | 1.2 | 1.2 |
| Isocyanate (NCO) | F | 36.9 | 22.6 | 22.6 | 40.6 | — | 22.6 | 22.6 | 40.6 | — | 22.6 | — | 22.6 | — |
| | G | 9.3 | 13.3 | 13.3 | 2.7 | 26.5 | 13.3 | 13.3 | 2.7 | 26.5 | — | — | — | — |
| | H | — | — | — | — | — | — | — | — | — | 14.5 | 28.9 | 14.5 | 28.9 |
| Diamine | I | 6 | 5 | 5 | 5 | 5 | 5 | 2 | 2 | 2 | 5 | 5 | 2 | 2 |
| Additives | J | 2 | 2 | 2 | 2 | 2 | 2 | 2 | 2 | 2 | 2 | 2 | 2 | 2 |
| | K | 3.5 | 0.2 | 0.9 | 0.9 | 0.9 | 0.9 | 0.9 | 0.9 | 0.9 | 0.9 | 0.9 | 0.9 | 0.9 |
| Solvent | L | 190 | 100 | 150 | 150 | 140 | 150 | 140 | 150 | 130 | 150 | 140 | 140 | 130 |
| | M | — | — | — | — | — | — | — | — | — | — | — | — | — |
| Production Method | | a | a | a | a | a | a | a | a | a | a | a | a | a |
| Reaction Conditions | | 90° C. 4 h | 90° C. 4 h | 90° C. 3 h | 90° C. 4.5 h | 80° C. 3.5 h | 90° C. 4.5 h | 90° C. 3 h | 90° C. 4.5 h | 80° C. 3.5 h | 90° C. 3 h | 80° C. 3 h | 90° C. 3 h | 80° C. 3 h |
| Remaining NCO % in Prepolymer [mass %] | | 3.70 | 3.46 | 3.45 | 3.29 | 3.65 | 3.41 | 3.49 | 3.30 | 3.65 | 3.40 | 3.61 | 3.41 | 3.60 |
| Nonvolatile Component in Dispersion [mass %] | | 45.5 | 60.1 | 49.9 | 50.2 | 50.0 | 49.8 | 49.7 | 50.1 | 50.3 | 50.0 | 49.6 | 50.5 | 49.9 |
| Volume-average Particle Size of | | 0.09 | 1.39 | 1.11 | 1.43 | 0.94 | 1.5 | 0.74 | 0.81 | 0.65 | 0.77 | 0.61 | 1.20 | 0.74 |

TABLE 1-continued

| | Synthesis Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Resin Particle [μm] | | | | | | | | | | | | | |
| Ratio of Linear Aliphatic Polyisocyanate [mol %] | 30 | 50 | 50 | 10 | 100 | 20 | 50 | 10 | 100 | 50 | 100 | 50 | 100 |
| Biomass Ratio [mass %] | 35.6 | 41.1 | 46.2 | 38.9 | 56.7 | 13.6 | 46.6 | 39.2 | 57.2 | 39.2 | 41.7 | 39.5 | 42.0 |
| Emulsification Performance | A | A | A | A | A | A | A | A | A | A | A | A | A |
| Dispersion Stability | A | A | A | A | A | A | A | A | A | A | A | A | A |

TABLE 2

| | | Synthesis Example | | | |
|---|---|---|---|---|---|
| | | 1 | 2 | 3 | 4 |
| Sample Designation | | Comparative PUD1 | Comparative PUD2 | Comparative PUD3 | Comparative PUD4 |
| Polyol | A | — | — | — | — |
| | B | 50 | 50 | 50 | 50 |
| | C | 50 | 50 | 50 | 50 |
| Chain Extender | D | 0.5 | 0.5 | 0.5 | 0.5 |
| Hydrophilic Component | E | 1.2 | 1.2 | 1.2 | 1.2 |
| Isocyanate (NCO) | F | 45.1 | 45.1 | 22.6 | — |
| | G | — | — | 13.3 | 26.5 |
| | H | — | — | — | — |
| Diamine | I | 5 | 2 | 5 | 5 |
| Additives | J | 2 | 2 | 2 | 2 |
| | K | 0.9 | 0.9 | 0.9 | 0.9 |
| Solvent | L | 160 | 150 | 160 | 150 |
| | M | — | — | 90 | 90 |
| Production Method | | a | a | b | b |
| Reaction Conditions | | 100° C. 3 h | 100° C. 3 h | 80° C. 5 h | 80° C. 5 h |
| Remaining NCO % in Prepolymer [mass %] | | 3.21 | 3.18 | 2.08 | 2.15 |
| Nonvolatile Component in Dispersion [mass %] | | 49.0 | 50.1 | 48.5 | 48.2 |
| Volume-average Particle Size of Resin Particle [μm] | | 2.14 | 1.84 | 0.03 | 0.04 |
| Ratio of Linear Aliphatic Polyisocyanate [mol %] | | 0 | 0 | 50 | 100 |
| Biomass Ratio [mass %] | | 37.1 | 37.4 | 46.2 | 56.7 |
| Emulsification Performance | | A | A | B | B |
| Dispersion Stability | | A | A | many lumps | many lumps |

Polyol A: Eternacoll UH-100 (polycarbonate diol, from Ube Industries, Ltd., hydroxyl value 112.2 mgKOH/g)
Polyol B: PTG-1000SN(P) (polyether diol, from Hodogaya Chemical Co., Ltd., hydroxyl value 112.2 mgKOH/g, proportion of plant based component 96%)
Polyol C: Benebiol NL1010DB (polycarbonate diol, from Mitsubishi Chemical Corporation, hydroxyl value 112.2 mgKOH/g, proportion of plant based component 14.4%))
Chain extender D: 1,4-butanediol
Hydrophilic component E: 2,2-dimethylolpropanoic acid
Isocyanate F: 4,4'-methylenebis(cyclohexyl isocyanate)
Isocyanate G: 1,5-pentamethylene diisocyanate (proportion of plant based component 70%)
Isocyanate H: 1,6-hexamethylene diisocyanate
Diamine I: 60% hydrated hydrazine
Additive J: triethylamine
Additive K: dodecylbenzenesulfonate
Solvent L: ion-exchanged water
Solvent M: acetone

[Production of Synthetic Artificial Leather (Synthetic Leather, Skin Layer)]

Reference Example 1

First, a solvent-type skin layer agent and a solvent-type adhesive each having the following formulation were prepared.

(Formulation of Solvent-Type Skin Layer Agent)
Resamine ME-8106 (polyurethane resin solution, from Dainichiseika Color & Chemicals Mfg. Co., Ltd.) 100 parts
Seikaseven BS-780 (s) Black (colorant, from Dainichiseika Color & Chemicals Mfg. Co., Ltd.) 20 parts
DMF predetermined amount (to make solid content 20%)

(Formulation of Solvent-Type Adhesive)

Resamine UD-8351NT (polyurethane resin adhesive, from Dainichiseika Color & Chemicals Mfg. Co., Ltd.) 100 parts C-50 Crosslinking Agent (isocyanate-based crosslinking agent, from Dainichiseika Color & Chemicals Mfg. Co., Ltd.) 10 parts The above-mentioned solution-type skin layer agent was applied to a release paper, and dried to form a skin layer having a thickness of about 40 μm. Next, the above-mentioned solution-type adhesive was applied onto the formed skin layer, and pre-dried to form an adhesive layer having a thickness of 40 μm. The resultant adhesive layer was pressure-bonded to a woven fabric using a lamination roll, and aged to give a synthetic artificial leather of Reference Example 1. The production conditions for the synthetic artificial leather are shown below.

[Production Conditions for Skin Layer]
Coating amount: 250 μm/wet
Drying condition: Dried at 100° C. for 2 minutes and then dried at 120° C. for 3 minutes.

<Adhesive Layer>
Coating amount: 100 μm/wet
Pre-drying: Dried at 80° C. for 2 minutes.
Lamination condition: Pressure-bonded at 40° C./clearance 0 μm.
Aging: Heated at 50° C. for 48 hours.

<Application Examples 1 to 5>

First, an aqueous skin layer agent and an aqueous adhesive each having the following formulation were prepared.
(Formulation of Aqueous Skin Layer Agent)
PUD 3 to 5, 10 and 11 100 parts
Seikaseven DW-1780 Black (colorant, from Dainichiseika Color & Chemicals Mfg. Co., Ltd.) 20 parts
(Formulation of Aqueous Adhesive)
Resamine D-1063 (aqueous polyurethane resin adhesive, polycarbonate ether-type, from Dainichiseika Color & Chemicals Mfg. Co., Ltd.) 100 parts
Resamine D-65 (isocyanate-based crosslinking agent, from Dainichiseika Color & Chemicals Mfg. Co., Ltd.) 10 parts The above-mentioned aqueous skin layer agent was applied to a release paper, and dried to form a skin layer having a thickness of about 40 μm. Next, the above-mentioned aqueous adhesive was applied onto the formed skin layer, and pre-dried to form an adhesive layer having a thickness of 40 μm. The resultant adhesive layer was pressure-bonded to a substrate using a lamination roll, and aged to give synthetic artificial leathers of Application Examples 1 to 5. Production of the synthetic artificial leathers was carried out under the same conditions as in Reference Example 1.

Application Comparative Example 1

An aqueous skin layer agent and an aqueous adhesive each having the following formulation were prepared.
(Formulation of Aqueous Skin Layer Agent)
Comparative PUD 1 100 parts
Seikaseven DW-1780 Black (colorant, from Dainichiseika Color & Chemicals Mfg. Co., Ltd.) 20 parts
(Formulation of Aqueous Adhesive)
Resamine D-1063 (aqueous polyurethane resin adhesive, polycarbonate ether-type, from Dainichiseika Color & Chemicals Mfg. Co., Ltd.) 100 parts
Resamine D-65 (isocyanate-based crosslinking agent, from Dainichiseika Color & Chemicals Mfg. Co., Ltd.) 10 parts The above-mentioned aqueous skin layer agent was applied to a release paper, and dried to form a skin layer having a thickness of about 40 μm. Next, the above-mentioned aqueous adhesive was applied onto the formed skin layer, and pre-dried to form an adhesive layer having a thickness of 40 μm. The resultant adhesive layer was pressure-bonded to a woven fabric using a lamination roll, and aged to give a synthetic artificial leather of Application Comparative Example 1. Production of the synthetic artificial leather was carried out under the same conditions as in Reference Example 1.

<Performance Evaluation of Synthetic Artificial Leather (Synthetic Leather, Skin Layer)>

The produced synthetic artificial leathers were evaluated in point of the cold-resistant flexibility and the softness thereof according to the methods and the criteria mentioned below. The evaluation results are shown in Table 3.

[Evaluation Methods]
(Cold-Resistant Bending Test)

The resultant synthetic artificial leathers were tested for cold-resistant flexibility under the conditions mentioned below, and the surface condition of each synthetic artificial leather was visually checked and evaluated.

Apparatus: cryostat-attached dematcher bending crack tester (from Yasuda Seiki Co., Ltd.)
Size of sample: 150 mm×50 mm
Inspection range: 100 mm×50 mm
Test condition: at −10° C./72 to 108% bending/30,000 times Evaluation criteria:
A: No crack.
B: Cracked in 1 to 3 sites.
C: Many cracks (in 4 sites or more).

(Softness)

The softness of the resultant synthetic artificial leathers was checked by hand touch, based on the synthetic artificial leather of Reference Example 1 as a standard, and evaluated according to the following criteria.

A: Much softer than the synthetic artificial leather of Reference Example 1.
B: Softer than the synthetic artificial leather of Reference Example 1.
C: Soft on the same level as that of the synthetic artificial leather of Reference Example 1.
D: A little harder than the synthetic artificial leather of Reference Example 1 (not so soft as the rank C).
E: Much harder than the synthetic artificial leather of Reference Example 1.

TABLE 3

|  |  | Main Resin in Skin Layer | Main Resin in Adhesive Layer | Cold-resistant Flexibility | Softness |
|---|---|---|---|---|---|
| Reference Example 1 |  | ME-8106 | UD-8351NT | A | Reference |
| Application Example | 1 | PUD3 | D-1063 | A | C |
|  | 2 | PUD4 |  | A | C |
|  | 3 | PUD5 |  | A | C |
|  | 4 | PUD10 |  | A | C |
|  | 5 | PUD11 |  | A | C |

TABLE 3-continued

|  | Main Resin in Skin Layer | Main Resin in Adhesive Layer | Cold-resistant Flexibility | Softness |
|---|---|---|---|---|
| Application Comparative Example 1 |  | Comparative PUD1 | B | E |

[Production of Synthetic Artificial Leather (Synthetic Leather, Adhesive Layer)]

Reference Example 2

First, an aqueous skin layer agent and an aqueous adhesive each having the following formulation were prepared.
(Formulation of Aqueous Skin Layer Agent)
  Resamine D-6065NP (aqueous polycarbonate polyurethane resin dispersion, from Dainichiseika Color & Chemicals Mfg. Co., Ltd.) 100 parts
  Seikaseven DW-1780 Black (colorant, from Dainichiseika Color & Chemicals Mfg. Co., Ltd.) 20 parts
(Formulation of Aqueous Adhesive)
  Resamine D-1063 (aqueous polyurethane resin adhesive, polycarbonate ether-type, from Dainichiseika Color & Chemicals Mfg. Co., Ltd.) 100 parts
  Resamine D-65 (isocyanate-based crosslinking agent, from Dainichiseika Color & Chemicals Mfg. Co., Ltd.) 10 parts The above-mentioned aqueous skin layer agent was applied to a release paper, and dried to form a skin layer having a thickness of about 40 μm. Next, the above-mentioned aqueous adhesive was applied onto the formed skin layer, and pre-dried to form an adhesive layer having a thickness of 40 μm. The resultant adhesive layer was pressure-bonded to a woven fabric using a lamination roll, and aged to give a synthetic artificial leather of Reference Example 2. Production of the synthetic artificial leather was carried out under the same conditions as in Reference Example 1.

Application Examples 6 to 10

First, an aqueous skin layer agent and an aqueous adhesive each having the following formulation were prepared.
(Formulation of Aqueous Skin Layer Agent)
  Resamine D-6065NP (aqueous polycarbonate polyurethane resin dispersion, from Dainichiseika Color & Chemicals Mfg. Co., Ltd.) 100 parts
  Seikaseven DW-1780 Black (colorant, from Dainichiseika Color & Chemicals Mfg. Co., Ltd.) 20 parts
(Formulation of Aqueous Adhesive)
  PUD 7 to 9, 12, 13 100 parts
  Resamine D-65 (isocyanate-based crosslinking agent, from Dainichiseika Color & Chemicals Mfg. Co., Ltd.) 10 parts The above-mentioned aqueous skin layer agent was applied to a release paper, and dried to form a skin layer having a thickness of about 40 μm. Next, the above-mentioned aqueous adhesive was applied onto the formed skin layer, and pre-dried to form an adhesive layer having a thickness of 40 μm. The resultant adhesive layer was pressure-bonded to a woven fabric using a lamination roll, and aged to give synthetic artificial leathers of Application Examples 6 to 10. Production of the synthetic artificial leathers was carried out under the same conditions as in Reference Example 1.

Application Comparative Example 2

First, an aqueous skin layer agent and an aqueous adhesive each having the following formulation were prepared.
(Formulation of Aqueous Skin Layer Agent)
  Resamine D-6065NP (aqueous polyurethane resin dispersion, from Dainichiseika Color & Chemicals Mfg. Co., Ltd.) 100 parts
  Seikaseven DW-1780 Black (colorant, from Dainichiseika Color & Chemicals Mfg. Co., Ltd.) 20 parts
(Formulation of Aqueous Adhesive)
  Comparative PUD2 100 parts
  Resamine D-65 (isocyanate-based crosslinking agent, from Dainichiseika Color & Chemicals Mfg. Co., Ltd.) 10 parts The above-mentioned aqueous skin layer agent was applied to a release paper, and dried to form a skin layer having a thickness of about 40 μm. Next, the above-mentioned aqueous adhesive was applied onto the formed skin layer, and pre-dried to form an adhesive layer having a thickness of 40 μm. The resultant adhesive layer was pressure-bonded to a woven fabric using a lamination roll, and aged to give a synthetic artificial leather of Application Comparative Example 2. Production of the synthetic artificial leather was carried out under the same conditions as in Reference Example 1.

<Performance Evaluation of Synthetic Artificial Leather (Synthetic Leather, Adhesive Layer)>

The produced synthetic artificial leathers were evaluated in point of the cold-resistant flexibility and the softness thereof according to the methods and the criteria mentioned below. The evaluation results are shown in Table 4.

[Evaluation Methods]
(Cold-Resistant Bending Test)

The resultant synthetic artificial leathers were tested for cold-resistant flexibility under the conditions mentioned below, and the surface condition of each synthetic artificial leather was visually checked and evaluated.
  Apparatus: cryostat-attached dematcher bending crack tester (from Yasuda Seiki Co., Ltd.)
  Size of sample: 150 mm×50 mm
  Inspection range: 100 mm×50 mm
  Test condition: at −10° C./72 to 108% bending/30,000 times
  Evaluation criteria:
    A: No crack.
    B: Cracked in 1 to 3 sites.
    C: Many cracks (in 4 sites or more).
(Softness)

The softness of the resultant synthetic artificial leathers was checked by hand touch, based on the synthetic artificial leather of Reference Example 2 as a standard, and evaluated according to the following criteria.
  A: Much softer than the synthetic artificial leather of Reference Example 2.
  B: Softer than the synthetic artificial leather of Reference Example 2.
  C: Soft on the same level as that of the synthetic artificial leather of Reference Example 2.
  D: A little harder than the synthetic artificial leather of Reference Example 2 (not so soft as the rank C).
  E: Much harder than the synthetic artificial leather of Reference Example 2.

TABLE 4

|  | Main Resin in Skin Layer | Main Resin in Adhesive Layer | Cold-resistant Flexibility | Softness |
|---|---|---|---|---|
| Reference Example 2 | D-6065NP | D-1063 | B | Reference |
| Application Example 6 |  | PUD7 | A | B |
| 7 |  | PUD8 | A | B |
| 8 |  | PUD9 | A | B |
| 9 |  | PUD12 | A | B |
| 10 |  | PUD13 | A | B |
| Application Comparative Example 2 |  | Comparative PUD2 | B | E |

[Production of Synthetic Artificial Leather (Artificial Leather, Immersion of Nonwoven Fabric)]

Reference Example 3

The following mixture liquid was prepared.
Resamine D-4080 (aqueous polycarbonate ether polyurethane resin dispersion, from Dainichiseika Color & Chemicals Mfg. Co., Ltd.) 100 parts
Ion-exchanged water predetermined amount (to make solid content 20%)

A nonwoven fabric was immersed in the prepared mixture liquid, and the excessive mixture liquid was removed by a mangle roller having a preset clearance of 0 mm, and then this was dried under the condition of 120° C./5 minutes to give an artificial leather of Reference Example 3. From the weight change of the resultant artificial leather, the PU (polyurethane) resin content in the nonwoven fabric was calculated.

Application Examples 11 to 15

The following mixture liquid was prepared.
PUD 3 to 5, 10, 11 100 parts
Ion-exchanged water predetermined amount (to make solid content 20%)

A nonwoven fabric was immersed in the prepared mixture liquid, and the excessive mixture liquid was removed by a mangle roller having a preset clearance of 0 mm, and then this was dried under the condition of 120° C./5 minutes to give artificial leathers of Application Examples 11 to 15. From the weight change of the resultant artificial leather, the PU (polyurethane) resin content in the nonwoven fabric was calculated.

Application Comparative Example 3

The following mixture liquid was prepared.
Comparative PUD1 100 parts
Ion-exchanged water predetermined amount (to make solid content 20%)

A nonwoven fabric was immersed in the prepared mixture liquid, and the excessive mixture liquid was removed by a mangle roller having a preset clearance of 0 mm, and then this was dried under the condition of 120° C./5 minutes to give an artificial leather of Application Comparative Example 3. From the weight change of the resultant artificial leather, the PU (polyurethane) resin content in the nonwoven fabric was calculated.

Application Comparative Example 4

The following mixture liquid was prepared.
Resamine D-6065NP (aqueous polycarbonate polyurethane resin dispersion, from Dainichiseika Color & Chemicals Mfg. Co., Ltd.) 100 parts
Ion-exchanged water predetermined amount (to make solid content 20%)

A nonwoven fabric was immersed in the prepared mixture liquid, and the excessive mixture liquid was removed by a mangle roller having a preset clearance of 0 mm, and then this was dried under the condition of 120° C./5 minutes to give an artificial leather of Application Comparative Example 4. From the weight change of the resultant artificial leather, the PU (polyurethane) resin content in the nonwoven fabric was calculated.

<Performance Evaluation of Synthetic Artificial Leather (Artificial Leather, Immersion of Nonwoven Fabric)>

The produced synthetic artificial leathers were evaluated in point of the cold-resistant flexibility and the softness thereof according to the method and the criteria mentioned below. The evaluation results are shown in Table 5.

<Evaluation Method>
(Softness)

The softness of the resultant synthetic artificial leathers was checked by hand touch, based on the synthetic artificial leather of Reference Example 3 as a standard, and evaluated according to the following criteria.

A: Much softer than the synthetic artificial leather of Reference Example 3.

B: Softer than the synthetic artificial leather of Reference Example 3.

C: Soft on the same level as that of the synthetic artificial leather of Reference Example 3.

D: A little harder than the synthetic artificial leather of Reference Example 3 (not so soft as the rank C).

E: Much harder than the synthetic artificial leather of Reference Example 3.

TABLE 5

|  |  | Resin for immersion | Main Resin Non-volatile Content [wt. %] | Volume-Average Particle Size [μm] | PU Content in Nonwoven Fabric [wt. %] | Softness |
|---|---|---|---|---|---|---|
| Reference Example 3 |  | D-4080 | 35.0 | 0.02 | 38.5 | Reference |
| Application Example | 11 | PUD3 | 49.9 | 1.11 | 40.1 | A |
|  | 12 | PUD4 | 50.2 | 1.43 | 39.6 | B |
|  | 13 | PUD5 | 50.0 | 0.94 | 40.0 | B |
|  | 14 | PUD10 | 50.0 | 0.77 | 40.5 | B |
|  | 15 | PUD11 | 49.6 | 0.61 | 40.2 | B |
| Application Comparative Example | 3 | Comparative PUD1 | 49.0 | 2.14 | 38.2 | D |
|  | 4 | D-6065NP | 30.0 | 0.03 | 38.2 | E |

As obvious from the results of Examples and Comparative Examples, according to the present invention, there can be provided an aqueous polyurethane resin dispersion which can reduce the amount of a volatile component to be discharged out of a system in a drying step and the energy amount needed for drying, and which can exhibit excellent softness and cold-resistant flexibility.

The invention claimed is:

1. An aqueous polyurethane resin dispersion, comprising polyurethane resin particles dispersed in water, which contains a nonvolatile component in an amount of 45% by mass or more,
wherein the polyurethane resin particles comprise a polyol component, an isocyanate component, and a diamine component,
the polyurethane resin particles comprise a reaction product of the polyol component, the isocyanate component, and the diamine component,
at least 50 mol % or more of the isocyanate component comprises 1,5-pentamethylene diisocyanate, and
the polyurethane resin particles have a volume-average particle size determined by dynamic light-scattering of from 0.05 to 5 μm.

2. The aqueous polyurethane resin dispersion according to claim 1,
wherein the diamine component comprises at an alicyclic diamine compound selected from the group consisting of cyclopentanediamine, cyclohexyldiamine, 4,4-diaminodicyclohexylmethane, 1,4-diaminocyclohexane, 1,3-bisaminomethylcyclohexane, and isophoronediamine.

3. The aqueous polyurethane resin dispersion according to claim 2, wherein at least one selected from the group consisting of the polyol component, the isocyanate component, and the diamine component is composed of a plant based raw material.

4. The aqueous polyurethane resin dispersion according to claim 1, wherein the polyurethane resin particles have a biomass ratio of 10% by weight or more.

5. The aqueous polyurethane resin dispersion according to claim 1, wherein the polyurethane resin particles fuse via a drying step to form a film.

6. A method for producing the aqueous polyurethane resin dispersion of claim 1, the method comprising:
reacting at least a polyol and an isocyanate in a mixing tank equipped with an impeller for circulating inside the tank and an impeller for imparting shear force.

7. A paint, comprising the aqueous polyurethane resin dispersion of claim 1.

8. The paint according to claim 7, further comprising at least one selected from the group consisting of an isocyanate-based crosslinking agent, a carbodiimide-based crosslinking agent, an oxazoline-based crosslinking agent, and an epoxy-based crosslinking agent.

9. A film arrangement, comprising a filmy material of the paint of claim 7.

10. A structure comprising the film arrangement of claim 9 as at least one of a skin layer, an interlayer and an adhesive layer.

11. A structure comprising the paint of claim 7 in at least one of a surface of the structure and an inside of the structure.

12. A synthetic artificial leather comprising the structure of claim 10.

13. The aqueous polyurethane resin dispersion according to claim 2, wherein the polyurethane resin particles comprise a diamine component, the diamine component comprising at least one aliphatic diamine compound selected from the group consisting of ethylenediamine, trimethylenediamine, hexamethylenediamine, and octamethylenediamine.

14. The aqueous polyurethane resin dispersion according to claim 2, wherein the polyurethane resin particles comprise a diamine component, the diamine component comprising at least one aromatic diamine compound selected from the group consisting of phenylenediamine, 3,3'-dichloro-4,4'-diaminodiphenylmethane, 4,4'-methylenebis(phenylamine), 4,4'-diaminodiphenyl ether, and 4,4'-diaminodiphenyl sulfone.

15. The aqueous polyurethane resin dispersion according to claim 2, wherein the polyurethane resin particles comprise a diamine component, the diamine component comprising a hydrazine selected from the group consisting of hydrazine, carbodihydrazide, adipic acid dihydrazide, sebacic acid dihydrazide, and phthalic acid dihydrazide.

16. The aqueous polyurethane resin dispersion according to claim 1, wherein the isocyanate component further comprises 4,4'-methylenebis(cyclohexyl isocyanate).

17. The aqueous polyurethane resin dispersion according to claim 1, wherein the polyurethane resin particles further comprise a short-chain diol component.

18. The aqueous polyurethane resin dispersion according to claim 1, wherein the polyurethane resin particles further comprise dimethylolpropanoic acid or dimethylolbutanoic acid.

* * * * *